DECIMAL CONVERTER

Filed June 14, 1954 2 Sheets-Sheet 1

INVENTOR.
ROBERT B. PURCELL
BY G. D. O'Brien
ATTORNEY

Dec. 2, 1958 R. B. PURCELL 2,862,660

DECIMAL CONVERTER

Filed June 14, 1954 2 Sheets-Sheet 2

| BINARY STATES | | | | | |
|---|---|---|---|---|---|
| INPUT PULSE NUMBER | COUNTER STAGE | | | | |
| | A | B | C | D | E |
| 1 | 1 | 0 | 0 | 0 | 0 |
| 2 | 0 | 1 | 0 | 0 | 0 |
| 3 | 1 | 1 | 0 | 0 | 0 |
| 4 | 0 | 0 | 1 | 0 | 0 |
| 5 | 1 | 0 | 1 | 0 | 0 |
| 6 | 0 | 1 | 1 | 0 | 0 |
| 7 | 1 | 1 | 1 | 0 | 0 |
| 8 | 0 | 0 | 0 | 1 | 1 |
| 9 | 1 | 1 | 1 | 1 | 0 |
| 10 OR 0 | 0 | 0 | 0 | 0 | 0 |

INVENTOR.
ROBERT B. PURCELL
BY [signature]
ATTORNEY 2,862,660

DECIMAL CONVERTER

Robert B. Purcell, China Lake, Calif.

Application June 14, 1954, Serial No. 436,747
6 Claims. (Cl. 235—61)
(Granted under Title 35, U. S. Code (1952), sec. 266)

The invention described herein may be manufactured and used by or for the Government of the United States of America for governmental purposes without the payment of any royalties thereon or therefor.

This invention relates to electronic counters and in particular to improved circuit means for converting the states of the binary stages of an electronic counter into the equivalent decimal number.

A previous type of circuit for converting a binary number into a decimal number used a resistor matrix with resistors of the proper values arranged to produce the necessary voltages to ignite and to extinguish an indicator light.

The principal disadvantage of a resistor matrix for obtaining the decimal equivalent of a binary number from an electronic counter is that the voltage differentials available for igniting and for extinguishing a neon indicator lamp are insufficient to cause reliable operation of the lamp without careful selection, or preburning, of the neon lamps and close matching of the binary stages. As a result, the construction and maintenance of such a device is relatively difficult and costly.

It is, therefore, an object of this invention to provide an improved decimal converter for an electronic binarily operated decade counter having binary stages which is economical to build and to maintain.

It is a further object of this invention to provide an improved decimal converter for an electronic binarily operated decade counter which does not require neon lamps specially selected for proper firing and extinction potentials.

A still further object of this invention is to provide a decimal converter for an electronic binarily operated decade counter in which the voltage differences developed are of such magnitude that standard nonprecision components can be used without decreasing the accuracy and reliability of the converter.

Figure 1:
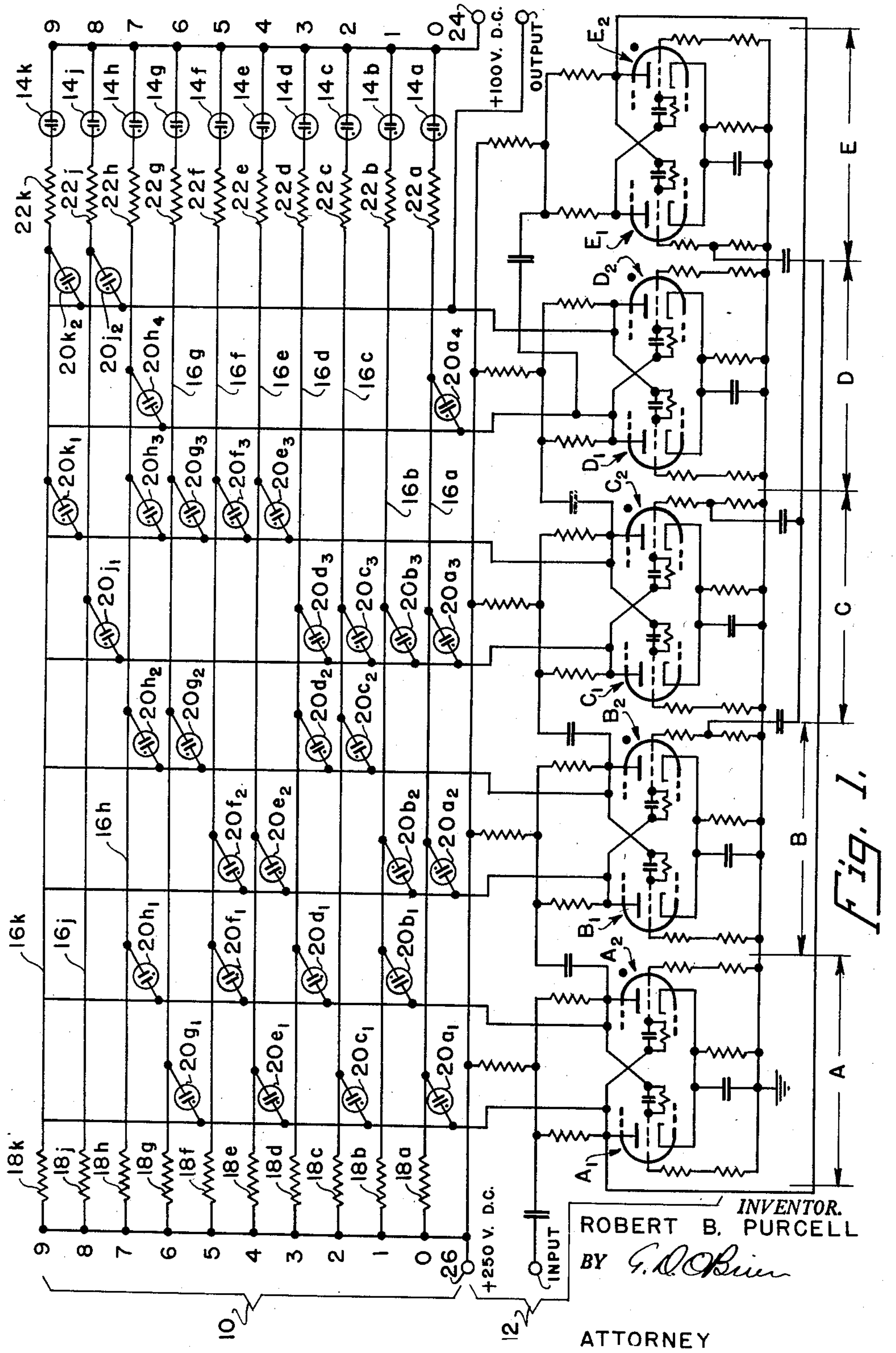
Figures 2, 3:
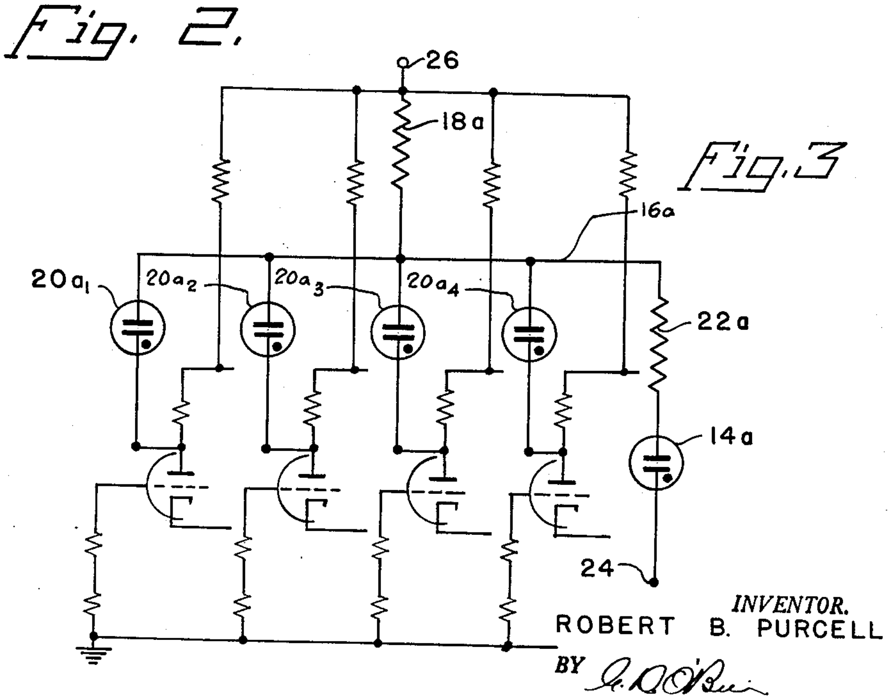

Other objects and many of the attendant advantages of this invention will be readily appreciated as the same become better understood by reference to the following detailed description when considered in connection with the accompanying drawing wherein:

Fig. 1 is a schematic diagram of the decimal converter with a binarily operated decade counter, Fig. 2 is a chart showing the states of the binary stages of the binarily operated decade counter for each number, and Fig. 3 is a schematic diagram of the circuit means for igniting one indicator lamp of the decimal converter.

Referring now to Fig. 1, the decimal converter 10 is illustrated as being connected to a binarily operated decade counter 12. Use of the decimal converter with a decade counter is considered to be the most promising application, and this use will therefore be described. However, the decimal converter may be used with any binary counters with or without modification to re-cycle after a specific count, such as the decade counter, which re-cycles after a count of ten. Counter 12 is an improved binarily operated decade counter which is described and claimed in my co-pending application, Serial No. 436,746, filed June 14, 1954, now abandoned, and entitled Binarily Operated Decade Counter. As described in the above identified application, binarily operated decade counter 12 consists of four conventional binary stages, A, B, C, D connected in cascade, plus feedback means, which include binary stage E, for converting the counter into a binarily operated decade counter. Each binary stage A, B, C, D, E has two thermionic tubes, $A_1$, $A_2$, $B_1$, $B_2$, $C_1$, $C_2$, $D_1$, $D_2$, $E_1$, $E_2$. Each binary stage also has two states, one state being defined as occurring when one of the tubes of a stage is conducting and the other is non-conducting, and the other, or second, state occurring when these conditions are reversed. In this application the 0 state is defined as occurring when the second tube; i. e., $A_2$ is conducting and tube $A_1$ is cut off, or non-conducting. The 1 state is defined as occurring when the first tubes; i. e., $A_1$ is conducting and tube $A_2$ is non-conducting. The dots beside tubes $A_2$, $B_2$, $C_2$, $D_2$, $E_2$ indicate that these tubes are conducting in the condition illustrated in Fig. 1 which corresponds to all the binary stages being in their 0 states. Fig. 2 is a chart which illustrates the states of each of the stages of binarily operated decade counter 12 for the numbers from 0 to 9.

To facilitate explaining the operation of the decimal converter, the circuit associated with one neon indicator light **14*a* is illustrated in Fig. 3. The control line 16*a*, or common terminal, is connected to a source of D. C. potential through current limiting resistor 18*a*. Neon lights 20$a_1$, 20$a_2$, 20$a_3$, 20$a_4$, which each have two electrodes, have one electrode of each lamp connected to control line 16*a* and the other electrode of each lamp connected to selected plates of the tubes of the binary stages A, B, C, D of counter 14 as shown in Fig. 1. Indicator neon light 14*a* also has two electrodes, one electrode is connected to control line 16*a* through limiting resistor 22*a* and the other electrode is connected at terminal 24 to a second source of D. C. potential. In a preferred form the potential of the second source, which is applied to terminal 24, is 100 volts D. C. while the potential of the first source, which is applied to terminal 26, is 250 volts D. C. As is well known, the potential of the plate of an electron tube which is conducting is considerably lower than the potential of the plate of a tube which is not conducting. The neon lamps, 20$a_1$, 20$a_2$, 20$a_3$, 20$a_4$ are connected so that one electrode of each of the neon lamps is connected to the plate of the tube of each stage of counter 12 which is not conducting, when the states of the stages A through D of counter 12 correspond to the number 0 assigned to the indicator light 14*a***.

In counter 12 the potential of the plate of the conducting tube of a binary stage is generally of the order of 50 volts D. C. while the potential of the plate of the non-conducting tube is of the order of 150 volts D. C. The voltage drop across neon lamps 20 and 14, when they are conducting, is approximately 55 volts. It is a characteristic of neon lamps that, when conducting, a substantially constant voltage drop will exist across them irrespective of the magnitude of the current flowing through the lamp within fairly broad limits. At least one of lamps 20$a_1$, 20$a_2$, 20$a_3$, 20$a_4$, will be conducting regardless of whether all plates of tubes $A_1$, $B_1$, $C_1$, $D_1$, are low or high, or some combination of low and high potentials. If one or more of the plates is low the control line **16*a* will be low; if all plates are high the control line will be high. As a result, the potential of control line 16*a* will be approximately 55 volts above the potential of the plate of the tube having the lowest potential. When the potentials of the plates of tubes $A_1$, $B_1$, $C_1$, $D_1$ to which neon lamps 20$a_1$, 20$a_2$, 20$a_3$, 20$a_4$ are connected, are high; i. e., 150 volts D. C., the potential of control line 16***a* will be about 205 volts. The voltage across the indicator neon lamp 14*a* which is available to fire the lamp will be approximately 105 volts since terminal 24 is maintained at a fixed D. C. potential of 100 volts in the circuit illustrated. A potential of 105 volts across a standard neon bulb will cause it to light with extreme reliability. Whenever the potential of one or more plates of tubes $A_1$, $B_1$, $C_1$, $D_1$ is low, the potential of control line 16*a* will drop to approximately 105 volts, 50 volts being the potential of the plate of a conducting tube and 55 volts being the voltage drop across a conducting neon lamp. A potential difference of 5 volts will exist across the indicator lamp 14*a* which will extinguish it.

The resistors 18 have a value designed to limit the current through lamps 20 within their ratings. Resistors 22 provide additional current limiting for lamps 14 where desirable. Generally, the resistors 22 are not necessary since resistors 18 can be chosen to properly limit current through lamps 20 and 14.

The common resistor and individual resistors in the plate circuit of each binary stage are typical of the circuits of nearly all binary counter stages.

By definition, it was determined that number 0 corresponds to stages, A, B, C, D being in their 0 states so that the potentials of the plates of tubes $A_1$, $B_1$, $C_1$, $D_1$ are high when the states of the binary stages of the decade counter are such as correspond to the number 0. Since the potentials of the plates of tubes $A_1$, $B_1$, $C_1$, $D_1$ are high, the potential of control line 16*a*, which is connected to these plates by means of neon tubes 20$a_1$, 20$a_2$, 20$a_3$, 20$a_4$, will also be high. As a result the potential available to fire indicator lamp 14*a* will be 105 volts which is enough to cause lamp 14*a* to ignite. The number which 14*a* is associated with, when lit, is then 0, 10 or multiples thereof. From Fig. 2 it can be seen that the only time the plates of tubes $A_1$, $B_1$, $C_1$, $D_1$ are high is when the number determined by the states of the stages of the counter correspond to 0, or when the states of the binary stages of counter 12 uniquely determine the number 0.

Neon indicator lamp 14*b* is lit when the states of the stages of the binary counter correspond to the number 1. At this time the potential of the plate of tube $A_2$ is high, as is the potential of the plates of tube $B_1$, $C_1$, $D_1$. However, it can be seen with reference to Fig. 2 that the number 1 is uniquely determined by the states of stages A, B and C, so that the control line 16*b* need only be connected by neon lamp 20$b_1$ to the plate of tube $A_2$, by neon lamp 20$b_2$ to the plate of tube $B_1$ and by neon lamp 20$b_3$ to the plate of tube $C_1$. Note that binary states 1, 0, 0 for stages A, B, C do not appear for any count other than the decimal number 1. Hence, use of the state of the fourth stage, D, to indicate the decimal number 1 would be redundant. This is similarly so for the other numerals in that only those stages needed to determine a number are used.

The number 2 is uniquely determined by the states of stages A, B, C of counter 12 when they are in their 0, 1, 0 states, respectively. Therefore, control line 16*c* has neon lamp 20$c_1$ connected to the plate of tube $A_1$, neon lamp 20$c_2$ connected to the plate of tube $B_2$, and neon lamp 20$c_3$ connected to the plate of tube $C_1$. When the potentials of the plates of these tubes are high, then the potential of control line 16*c* will be sufficient to cause indicator neon lamp 14*c* to be lighted.

The number 3 is uniquely determined by the states of stages A, B, C of counter 12 when they are in their 1, 1, 0 states, respectively. Therefore, control line 16*d* is connected by means of lamp 20$d_1$, 20$d_2$, 20$d_3$ to the plates of tubes $A_2$, $B_2$, $C_1$, respectively. Indicator lamp 14*d* will be lit only when the potentials of the plates of these tubes are high.

The number 4 is uniquely determined by the states of stages A, B, C when they are in their 0, 0, 1 states, respectively. Therefore, control line 16*e* is connected by neon lamp 20$e_1$ to the plate of tube $A_1$, by neon lamp 20$e_2$ to the plate of tube $B_1$, and by neon lamp 20$e_3$ to the plate of tube $C_2$. When the potentials of the plates of these tubes are high, then neon indicator lamp 14*e* will be lit.

The number 5 is uniquely determined by the states of stages A, B, C when they are in their 1, 0, 1 states, respectively. Therefore, control line 16*f* is connected by neon lamps 20$f_1$ to the plate of tube $A_2$, by neon lamp 20$f_2$ to the plate of tube $B_1$, and by the lamp 20$f_3$ to the plate of $C_2$. Indicator lamp 14*e* will be lit only when the potential of the plates of these tubes are high.

The number 6 is uniquely determined by the states of stages A, B, C, when they are in their 0, 1, 1 states, respectively. Therefore, control line 16*g* is connected by neon lamp 20$g_1$ to the plate of tube $A_1$, by neon lamp 20$g_2$ to the plate of tube $B_2$ and by neon lamp 20$g_3$ to the plate of tube $C_2$. Indicator lamp 14*g* is lit when the potential of the plates of these tubes are high.

The number 7 is uniquely determined by the states of stages A, B, C, D, when they are in their 1, 1, 1, 0 states, respectively. Control line 16*h* is connected to the plate of tube $A_2$ by neon lamp 20$h_1$, to the plate of tube $B_2$ by neon lamp 20$h_2$, to the plate of tube $C_2$ by neon lamp 20$h_3$, and to the plate of tube $D_1$ by neon lamp 20$h_4$. When the plates of these tubes are high, indicator lamp 14*h* will be lit.

The number 8 is uniquely determined by the states of stages C, D when they are in their 0, 1 states, respectively. Therefore, control line 16*j* is connected by neon lamp 20$j_1$ to the plate of tube $C_1$, and by neon lamp 20$j_2$ to the plate of tube $D_2$. When the potential of these plates are high, neon indicator lamp 14*j* will be lit.

The number 9 is uniquely determined by the states of stages C, D when they are in their 1, 1 states, respectively. Therefore, control line 16*k* is connected by neon lamp 20$k_1$ to the plate of tube $C_2$, and by neon lamp 20$k_2$ to the plate of tube $D_2$. When the potential of these plates are high, neon indicator lamp 14*j* will be lit.

In the foregoing explanation, the operation of the decimal converter has been made with reference to a particular binarily operated decade counter. It is to be understood that the decimal converter can be used with other types of binarily operated decade counters. Each of the control lines 16 for each of the indicator lights 14 could be connected by four neon lamps 20 to the plates of the stages A, B, C, D of the counter if desired. However, since many of the numbers from 0 to 9 are uniquely determined by the states of a lesser number of stages, the minimum number of connections between the control lines and the binary stages has been illustrated. The control lines could also be connected to the stages of the counter in other ways than those described and illustrated.

In a preferred embodiment the resistors 18 have the value of .47 megohms and resistors 22 have the value of 39K ohms. NE-2 type of neon lamps are used in the circuit.

Obviously many modifications and variations of the present invention are possible in the light of the above teachings. It is, therefore, to be understood that within the scope of the appended claims the invention may be practiced otherwise than as specifically described.

What is claimed is:

1. In a decimal converter for an electronic binarily operated decade counter having a plurality of binary stages, each stage having a first state and a second state, the first state occurring when the D. C. potential of one part of the stage is relatively high and the D. C. potential of a second corresponding part of the stage is relatively low, the second state occurring when the conditions of said parts are reversed, comprising; a plurality of neon lamps, each lamp having two electrodes, a control line, one electrode of each of said lamps being connected to the control line, a first source of D. C. potential connected to said control line through a current limiting resistor, a second source of D. C. potential lower than said first source, an indicator lamp, said indicator lamp being connected between said second source of potential and said control line, the second electrodes of each of said plurality of neon lamps being connected to said parts of said binary stages which are at high potential, and which uniquely identify the number associated with the states of said counter and with the indicator lamp when it is lit.

2. In a decimal converter for an electronic binarily operated decade counter having a plurality of binary stages, each stage having a first state and a second state, the first state occurring when the D. C. potential of one part of the stage is relatively high and the D. C. potential of a second corresponding part of the stage is relatively low, the second state occurring when the conditions of said parts are reversed, comprising; a plurality of neon lamps, each lamp having two electrodes, a control line, one electrode of each of said lamps connected to the control line, a first source of D. C. potential, a first current limiting resistor, said control line being connected to said first source through said first resistor, a second current limiting resistor, a second source of D. C. potential lower than said first source, an indicator lamp, said indicator lamp and said second resistor being connected in series between said second source of potential and said control line, the second electrodes of each of said plurality of neon lamps being connected to said parts of said binary stages which are at high potential and which uniquely identify the number associated with the states of said counter and with the indicator lamp when it is lit.

3. In a decimal converter for an electronic binarily operated decade counter having a plurality of binary stages, each binary stage having two thermionic electron tubes, each stage having at least a first and a second state, the first state occurring when the potential of the plate of one tube of the stage is high and the potential of the plate of the other tube is low, and the second state occurring when the conditions are reversed, comprising; a plurality of neon lamps, each neon lamp having two electrodes, one electrode of each lamp connected to a control line, a first source of D. C. potential, a first current limiting resistor, said control line being connected to said first source of D. C. potential through said first current limiting resistor, the second electrodes of each of said plurality of neon lamps connected to selected plates of the tubes of the stages of the binarily operated decade counter, the plates selected being the plates which when they are at their high potential uniquely identify a given number, a neon indicator lamp having two electrodes, a second current limiting resistor, one electrode of the indicator lamp being connected to said control line through said second resistor, the other electrode of said indicator lamp connected to a second source of D. C. potential, the potential of said second D. C. source being lower than the potential of the said first.

4. In a decimal converter as defined in claim 3 in which the potential of the second D. C. source substantially equals the potential of the plate of a tube when it is high, plus the voltage drop across a neon lamp when it is conducting, less the potential at which a neon indicator lamp will conduct with a high degree of reliability.

5. A decimal converter for a binarily operated decade counter having at least four binary stages, each stage having two states, the first state defined as occurring when the potential of the plate of one tube of the stage is high and the potential of the plate of the other tube of the stage is low, the second state defined as occurring when the conditions are reversed, comprising; ten circuit means, each circuit means having a neon indicator lamp, each indicator lamp, when lit, identifying a different number from 0 to 9, inclusive, said numbers being uniquely defined by different states of the stages of the counter, each circuit means having a control line, a first current limiting resistor, a second current limiting resistor, and a plurality of neon lamps, each lamp having two electrodes; a first source of D. C. potential, the control line of each circuit means being connected to said first source through its first current limiting resistor, a second source of D. C. potential, which is lower than said first, the indicator lamp and second current limiting resistor of each circuit means being connected in series between the control line of the circuit means of each indicator lamp and said second source of D. C. potential, one electrode of each of the plurality of neon lamps of each circuit means being connected to the control line of its circuit means, the other electrodes of each of the plurality of neon lamps of each circuit means being connected to the plate of the tube of the stages which are at their high potential when the states of the stages of the counter uniquely determined the number associated with the indicator lamp of each circuit means.

6. A decimal converter for a binarily operated decade counter having at least four binary stages, each stage having two states, the first state defined as occurring when the potential of the plate of one tube of the stage is high and the potential of the plate of the other tube of the stage is low, the second state defined as occurring when the conditions are reversed, comprising; ten circuit means, each circuit means having a neon indicator lamp, each indicator lamp, when lit, identifying a different number from 0 to 9, inclusive, said numbers being uniquely defined by different states of the stages of the counter, each circuit means having a control line, a current limiting resistor and a plurality of neon lamps, each lamp having two electrodes; a first source of D. C. potential, the control line of each circuit means being connected to said first source through said current limiting resistor, a second source of D. C. potential, which is lower than said first, the indicator lamp of each circuit means being connected in series between the control line of the circuit means of each indicator lamp and said second source of D. C. potential, one electrode of each of the plurality of neon lamps of each circuit means being connected to the control line of its circuit means, the other electrodes of each of the plurality of neon lamps of each circuit means being connected to the plate of the tube of the stages which are at their high potential when the states of the stages of the counter uniquely determine the number associated with the indicator lamp of each circuit means.

References Cited in the file of this patent

UNITED STATES PATENTS

| | | |
|---|---|---|
| 2,595,519 | Geohegan | May 6, 1952 |
| 2,693,593 | Crosman | Nov. 2, 1954 |
| 2,697,549 | Hobbs | Dec. 21, 1954 |
| 2,825,805 | Ziffer | Mar. 4, 1958 |